Fig. 3.
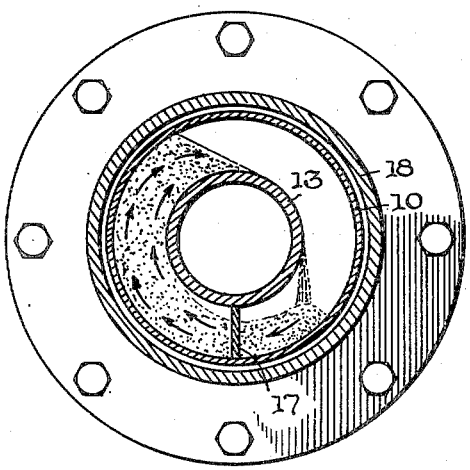
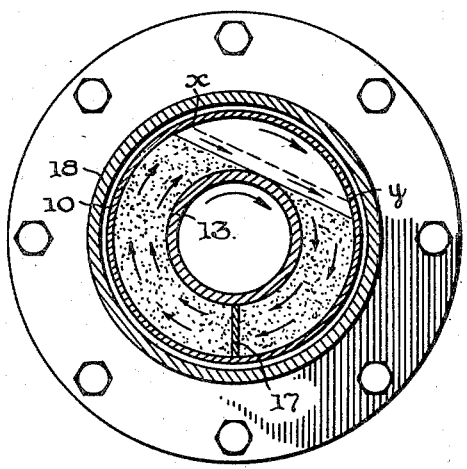
Fig. 4.
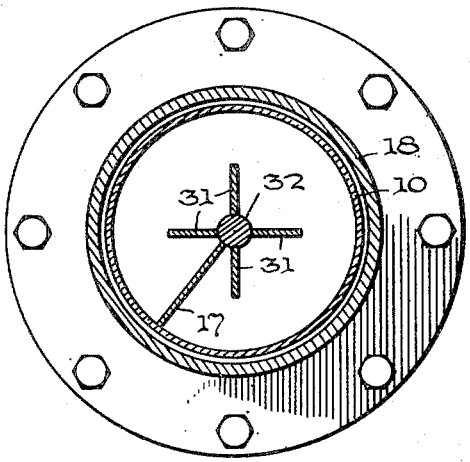
Fig. 5.
Inventors
WILLIAM C. OFFUTT
MERALD C. FOGLE
RALPH W. HELWIG
Their Attorney Inventors
WILLIAM C. OFFUTT
MERALD C. FOGLE
RALPH W. HELWIG Aug. 1, 1950 W. C. OFFUTT ET AL 2,517,339
PROCESS AND APPARATUS FOR EFFECTING
CHEMICAL REACTIONS
Filed Aug. 5, 1946 4 Sheets-Sheet 4
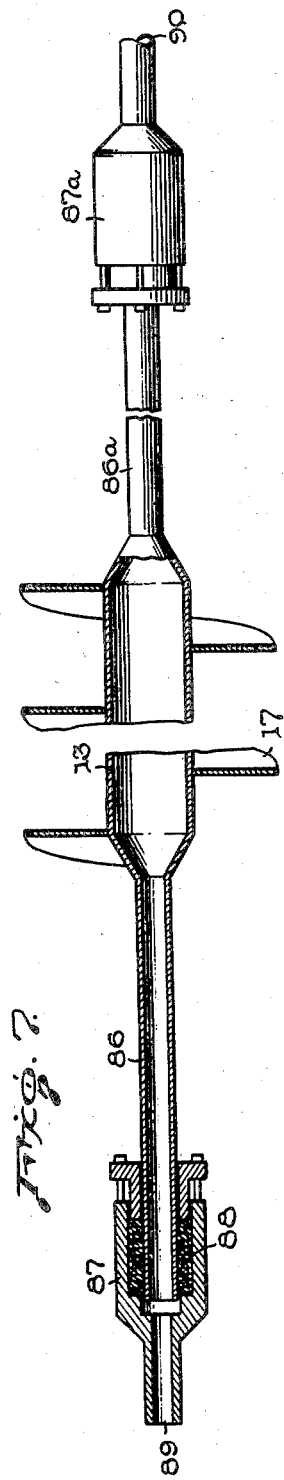
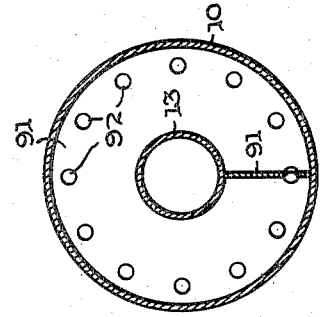
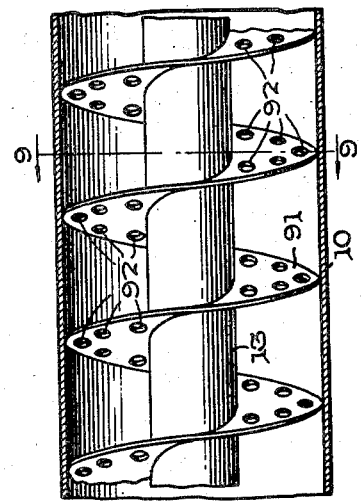
INVENTORS
WILLIAM C. OFFUTT
MERALD C. FOGLE
RALPH W. HELWIG
BY A. M. Houghton
their ATTORNEY Patented Aug. 1, 1950

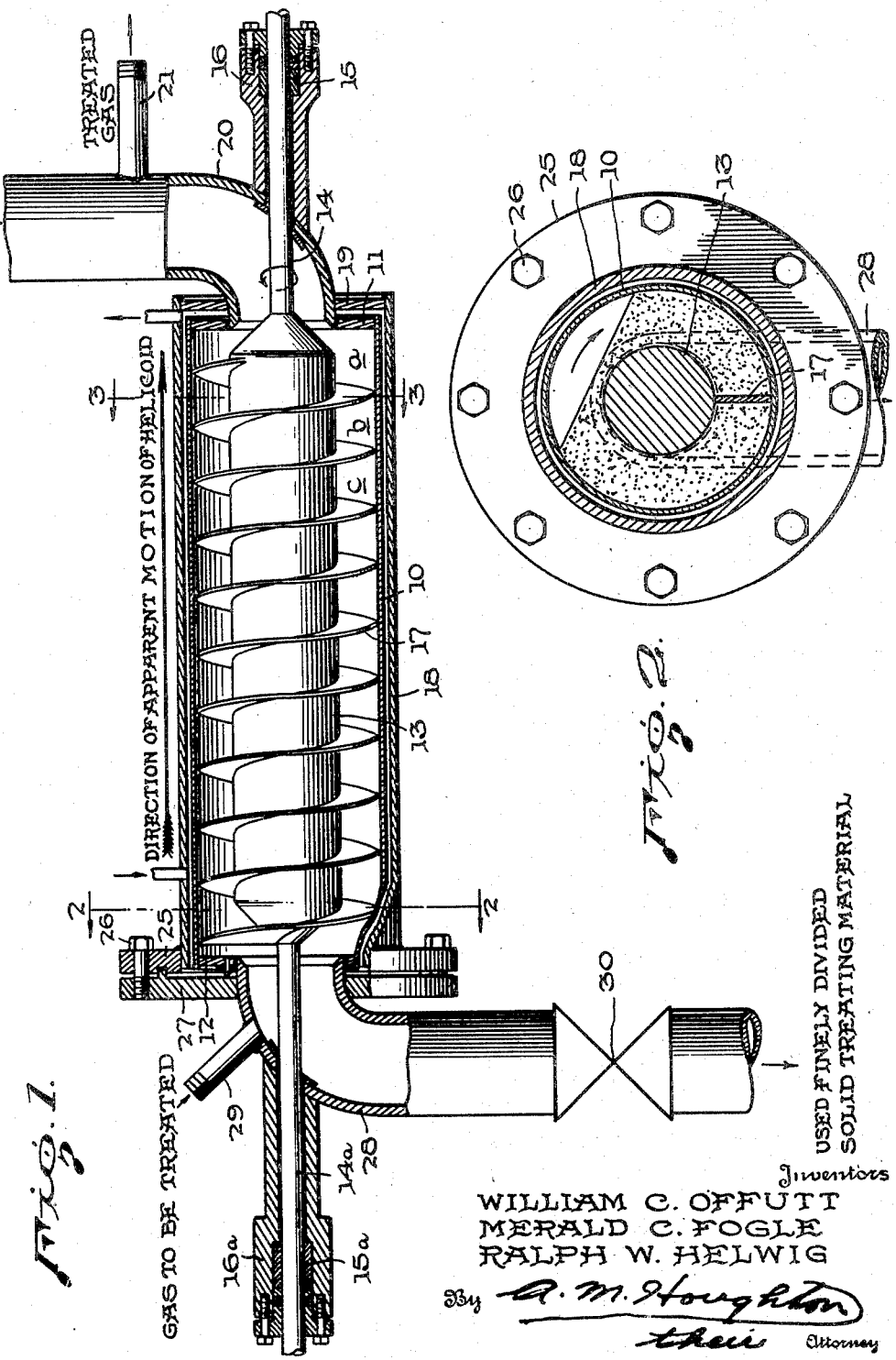

2,517,339

UNITED STATES PATENT OFFICE 2,517,339

PROCESS AND APPARATUS FOR EFFECTING CHEMICAL REACTIONS

William C. Offutt, Merald C. Fogle, and Ralph W. Helwig, Oakmont, Pa., assignors to Gulf Research & Development Company, Pittsburgh, Pa., a corporation of Delaware Application August 5, 1946, Serial No. 688,390

46 Claims. (Cl. 196—52)

This invention relates to a process and apparatus for effecting chemical reactions, wherein a fluid and a particulate solid treating material or agent are continuously brought into intimate and efficient contact in a zone of contact to effect a chemical reaction. In a particular aspect, our invention relates to a process and apparatus for effecting conversion or cracking of hydrocarbons under the influence of heat and in the presence of a finely divided or granular solid catalyst as the treating agent.

Many methods and apparatus for contacting hydrocarbon fluids with particulate treating agents, with constant or continuous replacement of the treating material, have been employed in the prior art. The development and design of such means and methods have involved a compromise between efficiency, uniformity and intimacy of contact between the fluid and solid treating agent being handled, on the one hand, and excessive wear and abrasion of the treating agent and of the apparatus on the other hand.

In general, those prior means and methods which have secured the highest efficiencies of contact have been apt to show the highest abrasion losses and the highest tendencies toward degradation and comminution of the treating agents being handled, while contrariwise, those prior means and methods which have shown relatively low wear and abrasion tendencies have usually demonstrated inherently low efficiencies of contact or other disadvantages.

Furthermore, many such prior processes and devices are inherently lacking in flexibility of operation, as for example, in respect of the rate of throughput of treating agent, or in respect of the range of particle size of the treating agent which may efficiently be handled.

It is an object of our invention, therefore, to effect efficient and uniform contact between a fluid and a solid particulate treating agent to effect chemical reaction, with minimum grinding and pulverizing of the treating agent, and with minimum wear and abrasion of the treating apparatus.

It is a further object of our invention to provide ease and flexibility of operation in the treatment of hydrocarbon fluids with solid particulate treating agents.

It is a further object of our invention to provide a novel and advantageous means and method for effecting chemical treatment of fluids.

These and other objects are achieved by the present invention wherein a stream of a solid particulate treating agent is passed through a reaction or contact zone in a substantially helical path, and a stream of the fluid to be treated is passed through the reaction or contact zone simultaneously in contact with the treating agent also in a substantially helical path.

More particularly, we pass a stream of a particulate treating agent into a helicoidal treating or contact zone having its principal axis in a substantially horizontal plane and we rotate the entire treating zone about its principal axis. The treating agent occupies a major portion of the free space of the treating zone. Rotation of the helicoidal treating zone results in movement of the treating agent away from its point of introduction and through the treating zone in a substantially helical path, as more fully described hereinafter. A stream of the fluid to be treated is passed through the helicoidal treating zone in a substantially helical path and is intimately contacted by the treating agent. The treating agent is discharged from the treating zone and may be reactivated or regenerated, if necessary, and recycled for reuse. The fluid to be treated may be passed through the treating zone either concurrently with the treating agent or countercurrently to the treating agent.

In accordance with our invention, we provide a cylindrical shell or vessel adapted for rotation about its principal axis and interiorly provided with a helicoid, the periphery of which is contiguous or attached to the inner wall surfaces of the vessel, the whole rotating as a unit and without relative movement between the shell or vessel and the helicoid. We provide means for introducing a stream of fluid at one end of the vessel and for removing it from the other end of the vessel, the disposition of the fluid inlet and outlet, respectively, depending upon whether it is desired to pass the fluid through the vessel in a direction concurrent with or countercurrent to the direction of transport of the particulate treating agent through the vessel.

We also provide means for introducing a particulate treating agent into one end of the vessel and for removing it from the opposite end of the vessel. The inlet and outlet for the particulate treating agent are disposed at such ends of the vessel with respect to the helicoid and the direction of rotation of the vessel, i. e., clockwise or counterclockwise, that upon rotation of the vessel and helicoid the whorls of the helicoid will have an apparent direction of movement away from the outlet means and toward the inlet means. The particulate treating agent is then moved by the rotating vessel through the vessel in a direction opposite to the apparent direction of movement of the helicoid. For example, in a horizontally disposed vessel having its principal axis normal to the line of vision of an observer, if the helicoid is in the form of a right-hand screw and appears to rotate clockwise when viewed from the end at the right of the observer, the whorls of the helicoid nearest the observer will appear to travel from the left to the right of the observer. In such case, in accordance with out invention, the inlet for treating agent is disposed at the right end of the vessel and helicoid, and the outlet is disposed at the left. Under the same conditions of observation, if the helicoid is in the form of a right-hand screw and appears to rotate counter-clockwise, then the inlet would be disposed at the left end and the outlet at the right because the whorls of the helicoid then appear to move from right to left. Under the same conditions of observation, if the helicoid is in the form of a left-hand screw and appears to rotate clockwise, the whorls of the helicoid nearest the observer appear to move from right to left, and the inlet is disposed at the left end and the outlet at the right. Again under the same conditions of observation, if the helicoid is in the form of a left-hand screw and appears to rotate counter-clockwise, then the whorls appear to move from left to right, and the inlet is disposed at the right end and the outlet at the left. As previously stated, the particulate treating agent is transported through the vessel by the rotation of the vessel and moves in a direction opposite to the apparent direction of motion of the helicoid.

By operating in the aforesaid manner, and by continuously passing particulate treating agent into the treating vessel, the treating agent occupies at least half of the free space within the vessel. The treating agent lying within the vessel is maintained in a series of adjacent beds, each under constant gently rolling or rotating motion in a direction largely transverse with respect to the axis of rotation of the vessel, and with continuous progress of treating agent from each bed to the next adjacent bed in a direction opposite to the direction of apparent movement of the helicoid. The average path of an individual particle of treating agent is substantially helical. This manner of progression of particulate treating agent through the vessel insures a minimum of wear and abrasion of the apparatus and pulverization and grinding of the treating agent. In contrast therewith, an ordinary screw conveyor will push the treating agent in a series of separate beds through the vessel in a straight line, with little or no transfer of material from one bed to the next adjacent bed. Furthermore, the action of the rotating helicoid and stationary casing of the ordinary screw conveyor will result in excessive grinding and pulverization of the treating agent.

Furthermore, in accordance with our invention, we avoid a continuous unobstructed free path for the fluid to be treated. With at least 50 per cent of the free space of the treating vessel occupied by particulate treating agent, we insure intimate, efficient and more uniform contact between the treating agent and the fluid. The fluid traveling through the treating vessel in a substantially helical path is repeatedly forced to pass through the several moving beds of treating agent lying between the whorls of the helicoid.

Continuous passage of particulate treating agent into the treating vessel may readily be accomplished by maintaining at the inlet end of the vessel a mass of particulate treating agent awaiting entry and limited in the rate of entry only by the capacity of the inlet to carry the treating agent. As aforesaid, this procedure results in maintaining within the treating vessel at all times an amount of treating agent occupying at least half of the free space of the vessel. We have found that it is possible to increase the degree of loading beyond this point, with consequent improvement of contact efficiency, by providing means for governing the discharge of treating agent from the discharge end of the vessel, such as a weir or orifice, preferably of adjustable type, located either in the discharge end of the apparatus or in a conduit or enclosed passage through which treating agent discharging from the vessel is removed. By restricting the size of the opening provided by such weir or orifice, the degree of loading may be increased, thus reducing the rate of through-put of treating agent through the vessel, but increasing that portion of the fluid path in which the fluid to be treated traverses the porous beds or masses of particulate treating agent.

We have found it especially advantageous to provide a central core or shaft coaxially disposed within the rotating vessel. By means of such a core, maximum uniformity of contact can be secured and maintenance of a proper degree of loading is facilitated. When the contacting vessel is provided with such a core, there is no opportunity for solid particles of treating agent lying in the central or axial portions of the vessel to rotate in the direction of rotation of the vessel without progressing longitudinally in the vessel along the principal axis. Without a core, some of the centrally disposed individual particles tend to remain in a more or less static condition, so far as ultimate transport through the vessel is concerned, and tend to remain in the apparatus for a longer time than those particles which traverse the outlying portions of the bed, i. e., nearer the walls of the vessel. Moreover, where no central core is provided, the natural tendency of the fluid traversing the vessel to follow the path of least resistance tends to some extent to cause the fluid stream to pass through the central portions of the interior of the vessel rather than through the outer portions. These factors combine to result in a certain divergence between the principal paths of travel of the fluids and solid treating agent, respectively, through the vessel; a considerable part of the movement of solids occurs outside of the principal path of the fluid, and a considerable part of the fluid passes through the relatively more static portions of the bed of solids.

By providing a central core located coaxially with the vessel, these disadvantages are readily overcome and uniformity of contact is materially improved. The particles or granules of solid treating agent move at a more uniform over-all rate through the apparatus, and the fluid follows a more extensive path and is brought into more uniform and efficient contact with all portions of the mass of treating agent. The core reduces the difference between the minimum and maximum paths of travel through the vessel for both the fluid to be treated and the treating agent, and assists in maintaining a relatively high level of solids within the vessel.

The size of the core relative to the size of the vessel may be varied over a wide range. In general, as the relative size of the core increases, uniformity of contact is improved, but there is some tendency to reduce the effective through-put of the apparatus as a whole. Consequently, when a high rate of throughput is the major consideration, the core should be of relatively small size or may even be dispensed with entirely. On the other hand, when a high degree of uniformity of contact is essential, even at the cost of some reduction in rate of throughput, a relatively large-sized core is advantageous. In many applications, as for example, in contacting hydrocarbons with solid particulate catalysts, we have found that the use of a core having a cross-sectional area corresponding to from about 25 per cent to about 35 per cent of the cross-sectional area of the vessel is advantageous. However, we do not limit ourselves to a core of that particular size. We have found that in order to achieve substantial results from the use of a core, it is desirable to employ a core having a cross-sectional area equal to 10 per cent or more of the cross-sectional area of the vessel. On the other hand, there is ordinarily no over-all advantage in increasing the cross-sectional area of the core to a point where it exceeds 50 per cent of the total cross-sectional area of the vessel.

The central core device, through appropriate extensions thereof, is conveniently designed to serve as a drive-shaft or support for the apparatus, but other driving and supporting mechanisms may be provided where desired.

The principal or longitudinal axis of the treating vessel is disposed in the horizontal plane or at a comparatively low angle with the horizontal. It is apparent that the device would not operate if the axis were disposed in a vertical direction, but some deviation from the horizontal is not necessarily disadvantageous and may even be advantageous in certain circumstances. In general, lowering the discharge end of the vessel below the inlet end, so far as solid treating agent is concerned, has comparatively little effect upon the operation of the device, but on the other hand we have observed little or no advantage, other than a slightly increased rate of throughput, in inclining the principal axis from the horizontal in this direction.

Where it is desired to elevate the solid treating agent simultaneously with its transport through the apparatus, the discharge end may be raised somewhat above the inlet end. We have found that the permissible inclination from the horizontal in this direction tends to be more strictly limited than is true of inclination from the horizontal in the opposite direction, it being more difficult to transport material up-hill than on a level or down-hill course. The angularity or relative pitch of the helicoid will, of course, have a definite bearing on the permissible inclination from the horizontal. With the axis in a horizontal position an increase in the pitch of the helicoid relative to the diameter of the vessel will, within limits, tend to effect more rapid transport of solid treating agent through the apparatus. However, the greater the inclination of the apparatus from the horizontal (assuming the discharge end to be above the inlet end), the smaller the relative pitch must be in order to achieve its intended effect of facilitating and promoting transport of the material through the apparatus.

While it is therefore impossible to specify exact limits, we have found it desirable, in general to avoid positioning the principal axis of the apparatus in a plane inclined more than about 20° from the horizontal. When the fluids being handled are gaseous or vaporous in character, inclining the principal axis of the vessel from the horizontal will have no effect upon the passage of the gas or vapor through the apparatus. Where the fluids being handled remain in the liquid or mixed phase during passage through the apparatus, inclination of the principal axis from the horizontal will, of course, have the effect of tending to cause the liquid phase to flow downward through the vessel toward the lower end thereof, unless this is counteracted by supplying liquid to the lower end of the vessel under a sufficient head or pressure to cause the liquid to move upwardly through the vessel.

While our invention may be applied to a wide variety of processes, it may be observed that our invention is principally applicable with respect to contacting finely divided or granular solid treating agents with gases and vapors. With respect to liquids, the application of our invention is generally limited to liquids of low viscosity, such as gasoline, benzene and the like, by virtue of the fact that passage of a viscous liquid through a vessel of the character indicated hereinabove will inherently have a tendency to entrain the solid treating agent also traversing the vessel. The tendency for entrainment will increase with the viscosity of the liquid, the rate of flow of the liquid, and with the ratio of the density of the liquid to the density of the solid treating material. Even where liquids of very low viscosities or gaseous fluids are treated, it is desirable to avoid passing the fluid through the vessel at such a high rate of flow as to cause substantial entrainment of solids in the fluid stream. When the fluids being handled are in the gas or vapor phase, it is desirable to regulate the flow of the same not only to avoid substantial entrainment of treating agent, but also to avoid causing the mass of particulate treating agent, especially if the latter is fairly finely divided, to become "fluidized" and thus prevented from resting upon and rotating with the walls of the treating vessel.

In general, we have found that the over-all rate of transport of the particulate treating agent through the treating vessel is governed principally by the internal diameter of the vessel, the rate of rotation of the vessel, the relative pitch of the helicoid that is, the ratio of the pitch of the helicoid to the diameter of the vessel), and the degree of loading. Other factors such as the shape, size and density of the solids being handled are of comparatively minor importance.

No specific dimensions need be given with respect to the diameter or length of the vessel, except to say that the length will usually represent several times the diameter.

The rate of rotation may vary over a wide range, although it is desirable to avoid such a high speed of rotation as would cause the solid particles of treating agent to be subjected to substantial centrifugal force. If such centrifugal action is permitted to reach a high enough point, the mass of solid particles will be caused to adhere to the inner surfaces of the rotating vessel and to rotate with it, without progressing through the vessel. The maximum permissible rate of rotation will, of course, be governed by the laws of centrifugal force and is therefore subject to calculation. It may be noted however, that the maximum permissible rate of rotation will vary with the diameter of the vessel, it being possible to rotate a unit of small diameter, without undesirable centrifugal effect, at a higher rate than is true of a vessel of larger diameter. We prefer, however, to employ speeds of rotation substantially below this maximum point. For general practice we prefer not to exceed rates of rotation of about 10 R. P. M. when using large vessels, i. e., having diameters of the order of 10 feet; and rates of rotation of about 20 R. P. M. for smaller vessels, i. e., having diameters of the order of 2 feet. In a given unit, increasing the rate of rotation to very high levels has a certain tendency to increase grinding and abrasion of the particulate treating agent being handled, so that it is advantageous in most cases to operate at relatively low rates of rotation for this reason alone.

We have found that the pitch of the helicoid relative to the diameter of the treating vessel may be varied over a wide range. In general, the use of a helicoid of short pitch results in a relatively long time of residence of the particulate treating agent in the vessel, a relatively low rate of throughput of treating agent for a given speed of rotation, and a relatively long path of travel for the fluid. The use of a helicoid having a relatively long pitch reduces the time of residence of the treating agent, increases the rate of throughput at a given speed of rotation, and reduces the length of the fluid path. It is best not to increase the pitch to a point where the angularity of the blades or whorls of the helicoid with respect to the principal axis of the vessel is less than the angle of repose of the particulate treating agent being handled. In actual practice, we prefer to use helicoids having pitches equal to from 0.1 to 0.5 times the diameter of the vessel.

We have referred hereinabove to the desirability of maintaining the amount of particulate treating agent within the vessel at a point where it occupies at least half of the free volume within the vessel. Increasing the loading beyond the point where the treating agent traversing the vessel occupies more than one-half of the free volume of the vessel tends to reduce the rate of throughput until, when the treating agent is permitted to occupy all or nearly all of the interior of the vessel, movement or transport thereof through the vessel is brought to a standstill. However, a moderate increase in the degree of loading beyond the 50 per cent point improves efficiency of contact between the fluid and the treating agent for the reason that the fluid is caused to traverse somewhat deeper beds of particulate solid material as it passes through the vessel. When no core is provided, we prefer to maintain such loading conditions that the treating agent occupies from about 55 per cent to about 75 per cent of the total interior volume of the vessel not occupied by the helicoid. When the vessel is provided with a core of suitable diameter, we have found that optimum results are obtained by maintaining a sufficient volume of treating agent within the vessel to just immerse the core therein. Under these conditions, a cross-sectional view of the vessel and contents would show the upper surface of the bed of treating agent as a chord lying in the angle of repose of the treating agent and tangential to or a little above the nearest upper surface of the core at the mid-point of the chord. Thus, with a core having a cross-sectional area equal to 10 per cent of the cross-sectional area of the treating vessel, the preferred range of loading is such that the treating agent occupies from about 67 per cent to about 80 per cent of the total volume of the annular space between the core and the interior walls of the vessel not occupied by the helicoid. In general, there is no advantage to be gained by increasing the loading to a point where the treating agent occupies more than about 90 per cent of the total free volume, i. e., the total interior volume of the vessel, minus the volume of the helicoid and minus the volume of the core, if a core is present.

When the optimum degree of loading referred to in the preceding paragraph is maintained, the use of a core having a cross-sectional area equal to approximately 10 per cent of the cross-sectional area of the interior of the vessel will result in the treating agent occupying approximately 67 per cent of the total free volume of the vessel at a given time. When the cross-sectional area of the core represents approximately 30 per cent of the cross-sectional area of the vessel, the optimum degree of loading referred to above will result in the treating agent occupying approximately 76 per cent of the total free volume of the vessel.

Because of the fact that the treating vessel is adapted to be rotated about its principal axis, with the fluid to be treated and treating agent moving in a general direction along the principal axis, it is convenient and advantageous to provide inlet and outlet means at opposite ends of the device which are coaxially disposed with respect to the principal axis of rotation. Such inlet and outlet means may be so constituted, when desired, as to conduct both treating agent and fluid. It is usually necessary to provide means for separating the treating agent from the fluid and to prevent escape of the fluid from the apparatus through the conduit or conduits handling the treating agent.

If desired, the treating vessel may, especially in those instances where contact is to be effected under superatmospheric pressure, be enclosed within a stationary outer casing to which the inlet and outlet ports, bearings and supporting mechanism may be attached where desired. In many cases it is desirable or advantageous to provide for passing a fluid heat-controlling medium such as water, oil, air, steam or the like, into or through the space lying between the rotating vessel and the stationary outer casing, whereby the temperature within the rotating vessel may be regulated. The purpose may be either to supply or remove heat. Where such heat control is especially important, the central core device and the whorls or blades of the helicoid within the vessel may alternatively or additionally be made hollow and intercommunicating, with provision for passing a fluid heat-controlling medium through the interior thereof.

In order to achieve minimum grinding and pulverization of the particulate treating agent being handled, we have found it desirable to avoid, insofar as possible, any substantial obstructions within the vessel other than are provided by the helicoid and the core. Ordinarily, those surfaces of the vessel, the helicoid and the core which come in contact with the treating agent are reasonably smooth, though they need not be highly polished. However, it may be desirable, especially in large apparatus and where the treating agent has a strong tendency to slide too freely along the surface of the interior wall of the rotating vessel, to roughen the interior surfaces of the vessel, or even to provide the vessel with ridges or ledges for promoting the transverse rotational movement of the treating agent. Generally, this is not necessary and such ridges or obstructions, if provided, are preferably made as small as possible.

We have found that our invention is especially useful and advantageous in cracking hydrocarbons under the influence of heat and in the presence of finely divided or granular solid catalyst as the particulate treating agent. In this aspect of our invention, the hydrocarbons to be converted are caused to pass through the apparatus in gaseous or vaporous form, or in mixed phase, usually countercurrent to the flow of finely divided solid treating material or catalyst and at the desired cracking temperature. The gaseous or vaporous products of cracking are withdrawn and fractionated or condensed to recover the valuable liquid products in accordance with conventional methods.

The cracking, decomposition, dehydrogenation or other conversion of hydrocarbons is usually accompanied by the formation of carbon, which deposits on and reduces the activity of the catalyst. It is therefore customary to remove the catalyst from the conversion vessel and to regenerate it in separate apparatus to restore its activity, after which it is returned to the conversion or reaction vessel for further contact with the hydrocarbon stream. Such regeneration may be accomplished by various means adapted to the particular catalyst and reaction taking place, but is ordinarily effected by contacting the heated catalyst with a gaseous regenerating medium such as air or other oxygen-containing gas or steam or mixtures thereof, depending upon the nature of the process and the catalyst.

Such regeneration may be variously effected, and in various forms of apparatus, regardless of the type of apparatus used for effecting contact between the catalyst and the hydrocarbon undergoing conversion. Thus, we may effect contact between a stream of hydrocarbons and a solid finely divided or granular catalyst in accordance with our invention and effect regeneration of the catalyst in apparatus of the vertical or horizontal kiln type or by temporarily suspending the catalyst in a stream of gaseous regenerating medium, or in any of the other ways known to the prior art. However, we have found that our invention is advantageous for effecting both the conversion and regeneration operations. We may therefore provide a pair of contact devices constructed in accordance with our invention, one serving as a means of contact between the catalyst and the hydrocarbon, i. e., as a reaction chamber, and the other serving as a regenerator, with provision for transporting the catalyst from one of said units to the other and back, and with suitable provision for sealing the interconnections between the two units to prevent escape of hydrocarbons from the reaction chamber into the regenerator and escape of the regenerating gas or the products of combustion from the regenerator into the reaction chamber.

Where our invention is employed to regenerate or reactive spent or partially spent catalyst after use in the conversion of hydrocarbons, it is desirable so to construct the apparatus as to provide for adequate control of the temperature of regeneration, especially where such regeneration is effected by means of combustion with air or other oxygen-containing gas to "burn off" the deposited carbon. Accordingly, it is sometimes desirable, where our apparatus is used for this and analogous purposes, to make provision for the introduction of a suitable fluid heat-control medium, either through the space lying between the outer stationary casing and the rotating vessel or through the interior of the hollow core lying within the vessel, or both. Moreover, in order to promote uniformity of temperature conditions throughout the vessel, it is sometimes even desirable to employ a helicoidal partition provided throughout either a portion or all of its length with a plurality of ports or openings preferably located in the outer portions thereof, and adapted to permit a part of the gases to pass through the same in a substantially straight line, instead of following the helical path which would otherwise be presented. By this means, the quantity of gaseous medium passing through the vessel may be increased, thereby controlling the reaction through removal of generated heat and assisting in preventing local overheating and possible deactivation or destruction of the treating agent being handled.

In order that our invention may be more clearly set forth and understood, we now describe with reference to the drawings accompanying and forming part of this specification, various preferred forms and embodiments of our invention. In these drawings:

Fig. 1 is an elevational view, with portions cut away, of a device for securing contact between hydrocarbon fluids and particulate treating agents, in accordance with our invention;

Fig. 2 is a vertical cross-sectional view of the apparatus illustrated in Fig. 1, taken at right angles to Fig. 1 and along the line 2—2 of Fig. 1;

Figs. 3 and 4 are vertical cross-sectional views of the apparatus illustrated in Fig. 1, taken at right angles to Fig. 1 and along the line 3—3 of Fig. 1, these figures illustrating different degrees of loading;

Fig. 5 is a vertical cross-sectional view similar to Fig. 4, but illustrating an alternative form of core device;

Fig. 7 is an elevational view, partly in section, of the hollow core of the device of Fig. 1, provided with means for passing a fluid heat-controlling medium through the core.

Fig. 8 is an elevational view, partly in section, of a shell and helicoid, showing a modified form of the helicoid; and Fig. 9 is a vertical cross sectional view of the apparatus illustrated in Fig. 8, taken at right angles to Fig. 8 and along the line 9—9 of Fig. 8.

Similar reference numerals designate similar parts in all of the several views of the drawings.

Figure 6:
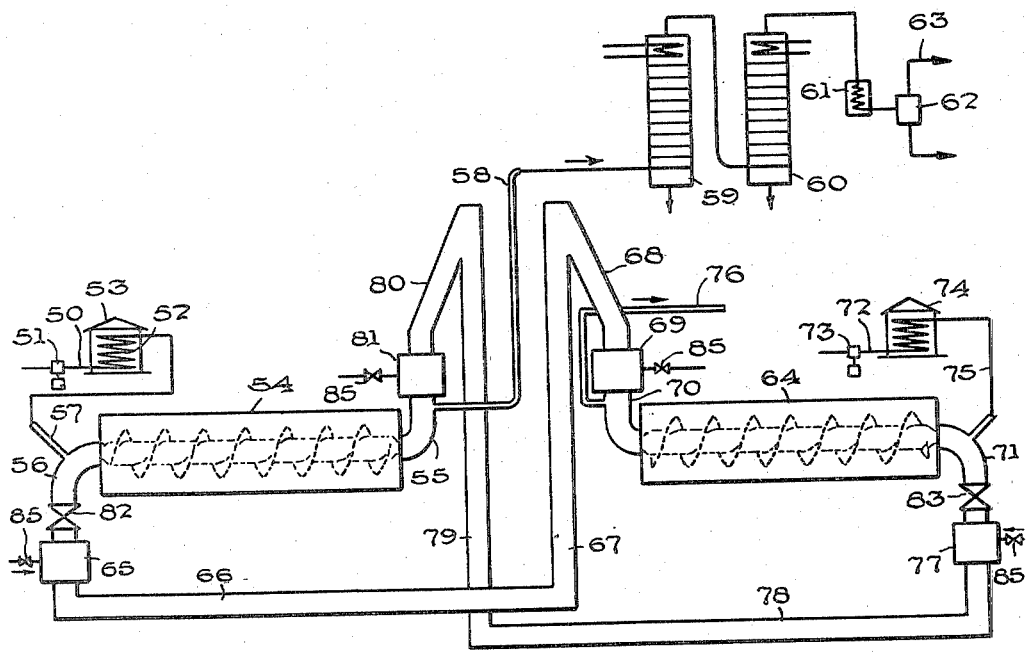
Fig. 6 is a more or less diagrammatic elevational view of apparatus for effecting cracking of hydrocarbon oil in accordance with our invention.

The apparatus illustrated in Figs. 1 to 4, inclusive, represents a preferred form of apparatus adapted to effect contact between hydrocarbon gases or vapors and finely divided or granular solid catalyst or other particulate treating agent or material with continuous flow of the hydrocarbon and particulate treating material. As shown in the drawings, the apparatus comprises a vessel or shell 10 of generally cylindrical configuration, disposed with its principal axis in a horizontal plane and having end closure members 11 and 12. The vessel 10 is, in the instance shown, interiorly provided with a coaxially disposed core 13, which may be either hollow or solid, and which extends throughout the major portion of the length of the vessel 10. The core 13 is mounted upon extensions or shaft members 14 and 14a which are suitably supported in bearings 15 and 14a located in bearing housings 16 and 16a, respectively. In the annular space between the core 13 and the casing 10 there is mounted on the core a helicoid 17, the periphery of which is contiguous to and integrally attached to the interior wall surfaces of the vessel 10. The vessel 10, core 13, shaft members 14 and 14a, and helicoid 17 rotate as a unit.

The vessel or shell 10 is located within an outer casing 18 which, in the instance shown, is of cylindrical configuration. The outer casing 18 is provided at one end with a closure member 19 to which is integrally attached a conduit 20 adapted to serve as a means for feeding particulate treating agent into the interior of the inner shell or vessel 10. A conduit 21, terminating in the conduit 20, is provided for the removal (or introduction, as the case may be) of vaporized or gaseous hydrocarbons. The bearing housing 16 at this end of the apparatus may, as shown, be integrally connected to the conduit 20.

At the opposite end of the apparatus, the outer casing 18 is provided with a flange 25 which is secured by bolts or other suitable fastening devices 26 to an end or closure member 27, to which is attached a conduit 28 terminating coaxially with the vessel 10 in or near the plane of the end member 12 and providing an outlet port for treating agent from the vessel 10. The bearing housing 16a supporting the shaft member 14a at this end of the apparatus is conveniently integrally attached to the conduit 28, and the latter is also provided with an intercommunicating conduit 29 serving to introduce hydrocarbon gas or vapor into the interior of the rotating vessel 10 (or, as the case may be, to remove such gas or vapor from the vessel 10). The conduit 28 is also provided with a valve 30 for regulating the flow of treating agent. As shown in Figure 1, the ends of the core member 13 terminate at sufficient distances from conduits 20 and 28, respectively, to provide for free flow of particulate treating agent into and out of the interior of the vessel 10. The ends of the helicoid 17 are also spaced a short distance from the conduits 20 and 28, respectively, in order to prevent them from interfering with the movement of the treating agent into and out of the interior of the vessel 10.

In the operation of the device illustrated in Figures 1 to 4, inclusive, the vessel 10 and its integrally attached parts are caused to be rotated in a clockwise manner as illustrated in Figures 2 to 4, i. e., in such direction that the direction of apparent motion of the helicoid 17, as shown in Figure 1, will be toward the inlet conduit 20. (This direction of rotation is graphically indicated in Figure 1 by arrows surrounding the shaft member 14). Such rotation is provided by a suitable driving mechanism or prime mover (not shown) attached to one of the shaft members 14 and 14a.

Particulate treating agent is fed into the apparatus through the conduit 20 in such a manner that a body or mass of such material is always provided in the conduit 20, awaiting entry into the interior of the vessel 10.

The treating agent entering the vessel 10 through the conduit 20 immediately tends to rotate with the vessel 10 and fills the section $a$ lying between the end member 11 and the nearest whorl of the helicoid 17 until it assumes the level illustrated in Fig. 3, the uppermost surfaces of the particulate treating agent lying in the angle of repose and at a point tangential to the upper surfaces of the core 13. As the device rotates, the particles reaching the upper surface roll downwardly along it and spill over the far side of the core 13. In so doing, these particles are gently deflected by the blade or whorl of the helicoid 17 and fall into the adjacent section $b$ in the lower part of the vessel 10. The particles of treating agent thus reaching the bottom of the vessel 10 in this section $b$ of the apparatus accumulate therein and tend to rotate with the cylinder until the upper surfaces again assume the level illustrated in Figure 3, at which point the particles of treating agent in the upper surfaces of the section $b$ are caused to fall downwardly over the core 13 and thus into the next section $c$, and so on. As shown in Figure 1, this action proceeds from right to left through the vessel 10. As the action progresses, the particulate treating agent works its way progressively through the vessel 10 in a general direction opposite to the apparent motion of the helicoid 17 (i. e., to the left as viewed in Figure 1), ultimately reaching the end opposite the end at which it was introduced, and discharging from the interior of the vessel 10 through the conduit 28. As this point is reached, the level of treating agent in each section of the vessel 10 has been caused to assume the approximate level illustrated in Figure 3 and, if the treating agent is permitted to discharge through the conduit 28 as fast as it reaches the discharge end of the vessel 10, then, so long as an unrestricted flow of treating agent through the inlet conduit 20 is maintained, the level of treating agent within the vessel 10 will remain throughout the vessel 10 as indicated in Figure 3. While the apparatus may be permitted to continue to operate in this manner, i. e., at the loading indicated in Figure 3, it will be observed that under these conditions the core 13 is not fully immersed in the bed of treating agent, so that the hydrocarbon gas traversing the apparatus in a spiral direction around the core 13, in traversing each section of the apparatus need pass only through a relatively shallow body of treating agent.

It is therefore of marked advantage to increase the degree of loading until the core 13 is immersed in the bed of treating agent, i. e., as shown in Figure 4, so that, as the gases traverse the apparatus and pass around the core 13 in a spiral direction, they are caused to pass through the treating agent over a great portion of the total gas path. Maintenance of the optimum loading condition illustrated in Figure 4, or a slightly higher degree of loading indicated by the broken line $x$—$y$ of Figure 4, is readily accomplished by restricting the rate at which the treating agent is permitted to escape from the interior of the vessel 10 through the conduit 28, as for example by partially closing the valve 30. When the flow is sufficiently restricted, the treating agent reaching the discharge end of the apparatus commences to build up in that portion of the conduit 28 lying above the valve 30 and ultimately in that portion of the interior of the rotating vessel 10 nearest the conduit 28, until the level of the treating agent in that portion of the vessel 10 lying nearest the conduit 28 assumes the approximate level illustrated in Figure 4, i. e., with the upper surface of the bed, when viewed in cross-section, forming a chord across the circular sectional area of the vessel 10, at a point tangential or somewhat above the upper surface of the core 13. With the valve 30 thus restricting the flow of treating agent through the conduit 28, the condition illustrated in Figure 4 then progresses section by section from that portion of the vessel 10 lying nearest to the conduit 28 to the opposite end, until the level of particulate treating agent throughout all of the interhelicoidal sections of the vessel 10 ultimately assumes the position illustrated in Figure 4 or a somewhat higher level. As the device continues to operate, the location of the upper surface of the treating agent throughout the apparatus will thus be governed by the setting of the valve 30.

Since it is ordinarily not possible to obtain visual inspection of the interior of the vessel 10 during operation, the proper setting of the valve 30 may be predetermined by appropriate calibration before the apparatus is put to use in any given process, as for example by measuring the throughput of treating agent through the apparatus in a given interval of time and at various settings of the valve 30 and comparing the results with the total free volume of the vessel 10, and the amount of treating agent retained in the vessel 10 for the various throughputs.

If the valve 30 is opened beyond the optimum point, the bed of treating agent throughout the apparatus will tend to assume the level shown in Figure 3. On the other hand, if the valve 30 is restricted to a point beyond the optimum point, the treating agent lying throughout the interior of the apparatus will rise in level to a point beyond that shown in full lines in Figure 4 (e. g., to a point illustrated by the broken line $x-y$ of Figure 4, with the core 13 completely immersed in and somewhat below the upper level of the treating agent), thereby reducing the throughput or rate of transport of the treating agent through the apparatus.

After the device has been put into operation and the desired level of particulate treating agent has been established, the hydrocarbon gases or vapors to be contacted with the treating agent are introduced, after suitable preheating, into the inlet conduit 29, passing through the vessel 10 in a direction opposite to the direction of transport of the treating agent and being withdrawn through the conduits 20 and 21.

Where desired, as noted above, the gas to be treated may be introduced to the apparatus through the conduits 21 and 20 and removed through the conduits 28 and 29, thus passing through the apparatus concurrently with the treating agent.

If the introduction of fresh treating agent through the conduit 20 is discontinued, the vessel 10 continuing to rotate in the direction indicated in Fig. 1, treating agent will continue to progress through the vessel 10 and discharge therefrom through the conduit 28 until the level of treating agent falls to such a point that all of the particles of treating agent no longer roll over the core 13, i. e., to a point just below the level illustrated in Figure 3. However, the vessel will not discharge beyond this point, except in that section lying adjacent to the conduit 28, where the level will be established by the opening provided by the conduit 28. If it is desired to empty the device without removing the end member 11 or the conduit 20, it is only necessary to reverse the direction of rotation of the vessel 10. When this is done, the direction of apparent motion of the helicoid 17 is toward the discharge end, and the device acts as an ordinary screw conveyor, emptying itself by conveying the treating agent remaining within the vessel 10 to the discharge conduit 28.

While in the device illustrated in Fig. 1, the core 13 is of cylindrical configuration, this configuration representing the simplest and most economical form of construction, it is not absolutely essential that the core device be so constructed. An alternative form of core device, illustrated in Fig. 5, comprises a plurality of radially disposed blades or vanes 31 mounted upon a shaft member 32. The vanes or blades 31, the helicoid 17 and the vessel 10 rotate as a unit, as in the device illustrated in Fig. 1. As the blades 31 rotate, they serve essentially the same primary function as the cylindrical core 13 illustrated in Fig. 1.

Core devices of various cross-sectional configurations, other than those shown in the drawings, may also be employed where desired. We have, however, illustrated those forms of core devices which are the simplest to construct and which we prefer to use.

In Figure 6, we have illustrated, in more or less diagrammatic fashion, a form of apparatus in which our invention may be adapted to the cracking of hydrocarbons under the influence of heat and in the presence of a finely divided or granular catalyst, with continuous regeneration of the catalyst. Referring to Figure 6, the hydrocarbon to be subjected to cracking, e. g., a petroleum oil such as a distillate stock (naphtha, kerosene or gas oil), or a residual oil (reduced crude, pressure-still tar or the like), or a hydrocarbon gas such as butane, butylene, propane, propylene, or any desired mixture of hydrocarbons, is supplied from a suitable source (not shown) through a line 50 having a pump or compressor 51 to pipe coil 52 located within a suitable furnace structure 53. In passing through the pipe coil 52, the hydrocarbon is heated either to the cracking temperature or to such a temperature that upon subsequent contact with hot catalyst the hydrocarbon will be raised to the desired temperature. Cracking of the hydrocarbons is effected by contacting the hydrocarbons at a suitably elevated temperature, with finely divided catalyst in a reaction zone 54, the details and interior construction of which are as shown in Fig. 1, the catalyst being introduced into and withdrawn from the rotating vessel 54 through inlet and outlet conduits 55 and 56, corresponding to the conduits 20 and 28 of Fig. 1. The preheated hydrocarbons leaving the pipe coil 52 pass through a conduit 57 into the conduit 56 and thence through the interior of the reaction vessel 54, traversing the latter countercurrently to the catalyst being advanced therethrough from conduit 55 to conduit 56 and undergoing cracking in the presence of the catalyst. Gaseous or vaporous products of cracking leave the reaction vessel 54 through the conduit 55 and pass through a conduit 58 to suitable fractionating columns 59 and 60, a condenser 61 and a separator 62, where they are fractionated and condensed to recover gasoline and other liquid products, the gases and vapor remaining uncondensed being withdrawn from the system through a conduit 63. The details of the fractionating and condensing system may vary widely.

During the course of the reaction taking place in the vessel 54, the catalyst gradually becomes reduced in activity by accumulation of carbonaceous deposits thereon, so that the catalyst reaching outlet conduit 56 requires regeneration before it can be re-employed. In the instance shown in Figure 6, we employ for this purpose a regenerator 64 similar in construction to the reaction vessel 54, i. e., to the apparatus illustrated in Fig. 1. The catalyst leaving the reaction vessel 54 through the conduit 56 passes through a purging or sealing section 65 of conventional design to a conveyor 66, to an elevator 67 and then is transported to a point lying above the regenerator 64.

The elevated catalyst then passes through a conduit 68 to a purging or sealing section 69 from which it is allowed to pass from an inlet conduit 70 to the interior of the rotating regenerator 64 which is so constructed and operated, in the manner set forth in the earlier portions of this specification, as to cause the solid material to be transported therethrough to an outlet conduit 71 located at the opposite end thereof. Air or other suitable fluid regenerating medium is introduced from a suitable source through a conduit 72 having a pump or compressor 73 and a heater 74 and then passes through a line 75 to the conduit 71 and thence into the interior of the regenerator 64, traversing the latter in a direction opposite to the flow of the catalyst under regeneration. The flue gas or spent fluid regenerating medium leaves the regenerator 64 through the conduit 70 and is withdrawn from the apparatus through a line 76.

Through contact with the regenerating medium in the regenerator 64, the catalyst is reactivated and rendered capable of further use in the reaction vessel 54. The regenerated catalyst leaving the generator 64 through the conduit 71 passes through a sealing or purging section 77 to a conveyor 78 to an elevator 79 which carries it to a point located above the reaction vessel 54, discharging it into a conduit 80, whence it flows by gravity through a purging or sealing section 81 and conduit 55 into the interior of the reaction vessel 54.

The conduits 56 and 71 are provided with control valves 82 and 83, respectively, corresponding to the valve 30 of Fig. 1, whereby the rate of flow of the catalyst through the reaction vessel 54 and regenerator 64 may be suitably controlled and regulated.

Each of the sealing or purging sections 65, 69, 77 and 81 is provided with a valved inlet 85 for admitting an inert fluid sealing medium, such as steam, under sufficient pressure to prevent the flow of hydrocarbon from the reaction vessel 54 to the regenerator 64 or the flow of fluid regenerating medium to the regenerator 64 to the reaction vessel 54, and also to purge the catalyst traversing the system of residual hydrocarbons, the latter function being particularly evidenced in sections 55 and 69.

In some instances, where the temperature of the catalyst and the catalyst-oil ratio are adequate, the pipe coil 52 and furnace 53 may be dispensed with and the hydrocarbon introduced in liquid form in conduit 57. In such case, the conduit 57 is extended into the interior of the reaction vessel 54 sufficiently to avoid escape of liquid through the outlet conduit 56. Where the hydrocarbon is introduced in liquid form in this manner, vaporization takes place in the reaction vessel 54. However, as previously stated, the hydrocarbon may flow through the reactor concurrently with the catalyst, and where the hydrocarbon is to be introduced into the reaction vessel in the liquid or mixed phase, concurrent flow will ordinarily be preferable. Ordinarily, however, the hydrocarbon is introduced through the conduit 57 in gaseous or vaporous form, and means (not shown) may be provided in the conduit 57 for separating and removing liquid constituents not vaporized in the heating coil 52.

As indicated in the earlier portions of this specification, both the reaction vessel 54 and the regenerator 64 may be suitably located within casings or enclosures, such as the outer casing 18 of Fig. 1 and, where desired, a fluid heat-controlling medium may be caused to traverse the space lying between the rotating vessels 54 and 64 and their respective outer casings. As has also been indicated, either or both of the units 54 and 64 may be so constructed as to permit passage of fluid heat-controlling media through the hollow interiors of the rotating cores located within such vessels, where such cores are provided. In such case, as shown in Figure 7, the hollow core 13 of the helicoid is mounted on hollow shafts 86 and 86a which are provided with conventional packing glands 87 and 87a containing a suitable packing 88. The fluid heat-controlling medium then enters or leaves the hollow core 13 through openings 89 and 90, as the case may be, depending upon the direction of flow of the fluid heat-controlling medium. It is preferable, in the reaction vessel 54, to provide an internally disposed helicoid which is imperforate. In the regenerator 64, however the helicoid may be either imperforate or, as shown in Figures 8 and 9, the helicoid 91 is provided with a plurality of ports or openings 92 to permit some of the fluid regenerating medium to pass therethrough, thereby making it possible to supply an excess of the fluid regenerating medium and to assist in controlling the temperature of regeneration.

It will be recognized that the expression "conversion of hydrocarbons" is a broad term and comprehends various processes, such as cracking or decomposition, dehydrogenation, desulfurization, aromatization, alkylation and the like, and that various hydrocarbons, catalysts or treating materials, and operating conditions may be employed in accordance with the broad aspects of our invention. By way of example, however, we have applied our invention with especially satisfactory results to the cracking of non-residual distillate hydrocarbon oils, such as gas oils and naphthas, at temperatures ranging from about 750° to 950° F., and at pressures ranging from atmospheric to about 200 pounds per square inch, in the presence of solid or finely divided granular catalysts such as various natural and artificial clays, fuller's earth, aluminas, bauxites and silica-alumina gels, with or without impregnation with activators such as chromium oxide, vanadium oxide, molybdenum oxide and the like.

Suitable catalyst-oil ratios (i. e., the ratios of throughputs of catalysts and hydrocarbons, respectively, expressed in similar units) may vary widely, as for example from 1:1 to 20:1. The use of high catalyst-oil ratios tends somewhat to increase the size of the apparatus and the investment cost, but normally results in high average or over-all activity of the catalyst and also facilitates supplying heat to the incoming hydrocarbons by means of contact with the heated catalyst.

The contact time, i. e., the time during which the hydrocarbons are permitted to remain in contact, under conversion conditions with the catalyst, may also vary widely. We have found it convenient to express the contact time in terms of space velocity (i. e., volumes of liquid oil per volumes of catalyst per hour) and, by way of example, space velocities of 0.5 to 3.0 or even from 0.2 to 5.0 are suitable. Greater space velocities ranging up to 15 or 20 are permissible or even desirable under certain conditions, as for example in desulfurization processes.

The particle size of the catalyst, or the particulate treating agent in general, may be varied over reasonably wide limits. Thus, catalysts may be used in the form of fine granules, pellets or beads. However, it is desirable to avoid the use of such a finely divided treating agent as would permit a substantial portion of the solid treating agent traversing the vessel to be entrained or "fluidized" in the moving stream of hydrocarbons. In the cracking of hydrocarbon oils, it is usually desirable to employ catalysts in definitely granular form, e. g. of at least such size as will not pass through a screen finer than about 20 mesh. It is one of the advantages of our invention that such a granular catalyst may be brought into efficient and intimate contact with a hydrocarbon stream without being subjected to excessive pulverization to a particle size either smaller than optimum or useless for the particular hydrocarbon treatment involved.

One of the advantages of our apparatus and method, as applied to catalytic cracking of hydrocarbons and in comparison with prior art apparatus and methods in extensive commercial use at the present time, resides in the fact that the reaction and regenerating units of such prior art devices are ordinarily disposed in a vertical or nearly vertical position, thus requiring the use of either very tall elevators or complicated "cyclone" systems for moving the catalyst back and forth through the system, and thus resulting in excessively high supporting structures. By means of our invention, in which the reaction and regenerating vessels are disposed in a substantially horizontal plane, the total height of the structure may be materially reduced.

In another aspect, our invention comprises a continuous coking process for the conversion of heavy low-value petroleum residues, such as reduced crudes, cracking residues and the like, into solid coke and valuable distillates. In the coking processes practiced in industry, the coke is produced by cumbersome and expensive batch processes which usually involve gradual deposition of the coke in large chambers from which it must be removed before the chambers can be used again. Removal of the coke from these chambers is difficult and requires an excessive amount of manual labor. On the contrary, in accordance with the coking process of our invention, the coke is continuously formed within a chamber and continuously removed therefrom mechanically in a form easy to handle.

In the coking process of our invention, the heavy oil to be coked is preheated to a suitable temperature by any suitable means such as a preheating coil, and continuously contacted in a flash chamber with a downwardly flowing stream of a hot, particulate treating agent which, in this instance, is a granular, refractory porous material. Normally, the granular porous material has been heated, as is subsequently described, to such an extent that it will supply the heat required for the coking operation. In the flash chamber, the vaporizable portions of the charge stock are volatilized and withdrawn, and the heavy non-vaporizable portions are completely absorbed by the hot, granular porous material into its numerous small pores. Steam or other inert gas may be injected into the flash chamber to aid in stripping the vaporizable portions of the charge stock from the coking constituents. The granular material with the charge stock absorbed therein then passes through a coking vessel which may take a form similar to the apparatus shown in Fig. 1 and which moves the granular material therethrough in the manner previously set forth therein. During passage through the apparatus, the non-vaporizable portions of the original charge stock are converted to coke and vaporized products. Steam or other inert gas is passed through the apparatus, as for example through the conduits 21 and 29 of Fig. 1, either concurrently or countercurrently to the stream of granular material in order to remove the vaporized products from the hot reaction zone before they are excessively cracked to light gases. During passage through the apparatus, the granular material with its absorbed charge is tumbled in the manner previously described for an apparatus of the type shown in Fig. 1, so that any tendency of the granules to agglomerate or stick to the surfaces of the coking vessel is reduced. The vaporized portions of the charge stock from the flash chamber and the vaporized products from the coking vessel may be combined, if desired, or separately treated in any known manner. The dry coked granular material leaving the coking vessel may then be regenerated in any suitable manner, as for example, by burning off the coke on a moving grate of a steam boiler, thus producing high pressure steam for use in the refinery. The granular material, burned free of coke, is discharged from the boiler and, while still hot, passes into the first described flash chamber for repetition of the coking cycle.

In addition to removing the vaporized products from the coking vessel, the steam or other inert gas passed therethrough may also supply any excess heat required for the coking. Normally, however, the granular porous material, burned free of coke in the boiler, is sufficiently hot to supply the heat required in the coking operation.

Various granular materials may be used for the coking operation. In general, such materials should be porous and resistant to fusing at the high temperatures obtained in burning off the coke. For example, a crushed and graded refractory of the aluminum oxide type is very satisfactory. Spent natural or synthetic catalysts of the alumina-silica type used for catalytic cracking of hydrocarbons may also be used. If desired, a granular porous coke may be used. In such case, in lieu of the coke burn-off described above, the granular material leaving the coking vessel may be subjected to partial combustion as a means of securing the necessary temperature for the coking operation. The granular material should absorb at least five per cent of its weight of the non-vaporizable portion of the charge stock, and preferably fifteen to twenty per cent or higher.

The conditions for coking in accordance with our invention may vary widely. Generally, the temperatures obtaining in the coking vessel are above about 800° F. The temperature of the charge stock entering the flash chamber may range from about 800° to 1100° F. Since coke formation in the preheating coil is undesirable, the allowable charge stock inlet temperature is chosen with regard to the specific charge stock employed so as to avoid coke formation before the charge stock reaches the flash chamber. In normal operation, where the charge stock is preheated, the temperature at which the granular porous material enters the flash chamber is between about 900° to 1200° F. Where it is desired to use the heat of the granular porous material for the flashing operation, the granular material may enter the flash chamber at higher temperatures. Where the temperature and throughput of the granular porous material are sufficiently high, preheating of the charge stock may be eliminated entirely. In such case, the temperature at which the granular material enters the flash chamber may be as high as 1500° to 1600° F.

Coke yields obtained will vary with the gravity and nature of the charge stock. In general, such yields will be between about 10 and 70 weight per cent of the charge stock. For a 10° A. P. I. gravity charge stock, coke yields between about 20 and 50 weight per cent of the charge may be obtained. The total yield of distillate for heavy charge stocks will be between about 15 to 95 volume per cent of the charge stock. This includes the distillate obtained from the flash chamber from the vaporizable portions of the charge stock, and the distillate obtained from the coking vessel from the vaporized products of the coking operation.

The coking process of our invention provides an advantageous method of treating heavy petroleum residues. The coke is obtained in a convenient form easy to handle and is removed from the coking vessel mechanically. The passage of the granular material through the coking vessel in a substantially helical path and the tumbling obtained thereby reduces any tendency of the granules to agglomerate or stick to the surfaces of the coking vessel. Furthermore, passage of steam or other inert gas through the coking vessel in a substantially helical path insures efficient stripping of the vaporized products of coking and thereby avoids excessive degradation of valuable distillate to light gases. The wide range and flexibility of coking conditions obtainable enable the coking of widely varying types of heavy petroleum charge stocks as well as the coking of coal tars to obtain valuable byproducts.

While we have referred hereinabove to the use of our invention for cracking hydrocarbons, our invention is capable of utilization and application to many other processes of treating hydrocarbons, of which representative examples are as follows:

(1) Treating cracked hydrocarbon vapors for the removal of color-forming and gum-forming constituents by contacting such vapors with particulate adsorbents such as clays, gels and the like.

(2) Regeneration of spent particulate treating agents previously employed in purifying or treating hydrocarbon gases and vapors by contacting such spent treating agents with steam, air or other suitable gaseous regenerating media.

(3) Desulfurization of hydrocarbons by contacting the same at elevated temperatures with bauxite, nickel and other heavy metal oxides and sulfides supported on solid gels, clays, pumice or other supporting media.

(4) Pyrolysis, dehydrogenation, hydrogen-action or isomerization of hydrocarbon gases in the presence of particulate solid catalysts.

(5) Hydrogenation of hydrocarbon oils or polymerization of hydrocarbon gases, under elevated pressures and temperatures, and in the presence of suitable particulate solid catalysts.

It will be understood that in carrying out such processes a wide range of conditions of temperature, pressure, throughput and contact time, and specific hydrocarbons and catalysts may be employed, in accordance with known process considerations. Other applications of our invention to the treating or conversion of various hydrocarbons will suggest themselves to those skilled in the art.

In addition to the processes shown hereinabove, our invention may also be used advantageously in chemical syntheses, particularly in the synthesis of organic compounds by the reaction of carbon monoxide and hydrogen in the presence of a solid particulate catalyst. For example, in the production of hydrocarbons from carbon monoxide and hydrogen, as in the well known Fischer-Tropsch reaction, the process and apparatus of our invention present many advantages over prior practices. Thus, in such hydrocarbon syntheses, we achieve intimate, efficient and more uniform contact between the reacting gases and the particulate catalyst without pulverizing and grinding the catalyst, while, at the same time, retaining the advantages of a moving bed catalyst. The flexibility and ease of control of our apparatus permit low throughput of catalyst, which is desirable in the hydrocarbon syntheses, since it is ordinarily unnecessary to regenerate the catalyst as often as in certain other catalytic processes such as the catalytic cracking of hydrocarbons. When operating in accordance with our invention, the desirable low catalyst throughputs may easily be obtained as, for example, by increasing the size of the core, decreasing the rate of rotation of the apparatus, using a helicoid of relatively short pitch or increasing the degree of loading of catalyst, or a combination of these factors, all as more fully described hereinabove. Notwithstanding the low rate of catalyst throughput, the tendency for local over heating or the formation of "hot spots" on the catalyst is reduced because the repeated turn-over or tumbling of each particle of catalyst insures thorough mixing and dissipation of excessive "hot spots." The catalyst emerging from the reactor may be regenerated in known manner, if necessary, or recycled to the reactor and may be reused until deactivated, whereupon it is regenerated.

In order to remove the exothermic heat of reaction, the reaction vessel may be provided with a stationary outer casing as previously disclosed, and a cooling medium circulated through the space between the rotating reaction vessel and stationary outer casing. Additionally, in this instance, the core and blades of the helicoid may be made hollow and intercommunicating and a cooling medium passed through the interior thereof. If further cooling surface is desirable, two or more hollow bladed helicoids may be mounted on the hollow core.

Any of the known catalysts for the synthesis of hydrocarbons from hydrogen and carbon monoxide may be employed, particularly the metals of group VIII of the periodic system, such as iron, cobalt and nickel. The catalysts may be supported on materials such as kieselguhr, silica gel and the like, or unsupported, and may additionally contain promoters such as thoria, manganous oxide and the like. The catalysts may be used in the form of pellets or may be relatively finely divided but not to such an extent that would permit a substantial portion thereof to be entrained or fluidized in the moving stream of reactant gases.

Specific reaction conditions for the synthesis of normally liquid hydrocarbons may vary widely. The reaction temperature may range from about 350° F. to about 650° F., and the pressure may range from atmospheric to about 400 pounds per square inch. For example, when using an iron catalyst, the temperature may range from about 425° F. to 650° F. and the pressure from about 150 to 350 pounds per square inch, these pressures and temperatures favoring olefin production in the hydrocarbon reaction products and suppressing the formation of heavy waxy reaction products on the catalyst. The composition of the synthesis gas, that is, the ratio of hydrogen to carbon monoxide normally varies from about 2:1 to 0.7:1 depending upon the specific catalyst used. For an iron catalyst, a ratio of 1:1 is preferred.

We are aware of the prior treatment of hydrocarbons by passing them in admixture with a solid treating agent through an ordinary screw conveyor consisting of a helicoid or screw adapted to be rotated within a stationary casing. In the ordinary screw conveyor, the solid treating agent is longitudinally displaced or pushed through the conveyor in the apparent direction of motion of the helicoid and thus moves in a substantially straight line. However, in the process and apparatus of our invention, the particulate treating agent moves through the apparatus in a substantially helical path and in a general direction opposite to the apparent direction of motion of the helicoid. In our invention, not only is the pulverizing and grinding action of the ordinary screw conveyor on the treating agent avoided, but more efficient, uniform and intimate contact between the treating agent and the hydrocarbon fluid is achieved.

What we claim is:

1. In a process for effecting a chemical reaction wherein a fluid is treated with a non-fluidized solid particulate treating agent in a reaction zone to effect said chemical reaction, the steps which comprise passing a stream of said treating agent through said reaction zone in a substantially helical path, said treating agent occupying a major portion of the free space of said reaction zone, simultaneously passing a stream of said fluid in a substantially helical path through said reaction zone in contact with said treating agent, withdrawing treating agent from said reaction zone, and withdrawing treated fluid from said reaction zone.

2. The process of claim 1 wherein the treating agent and the fluid are passed countercurrently through the reaction zone.

3. The process of claim 1 wherein the treating agent withdrawn from the reaction zone is recycled to the reaction zone.

4. A process of cracking a hydrocarbon oil comprising passing a stream of said oil, in vaporous form, through a reaction zone of helical configuration, passing a non-fluidized solid particulate catalyst through said reaction zone in a direction opposite to the flow of the vaporous oil and in a substantially helical path, said catalyst occupying a major portion of the free space of said reaction zone, maintaining the oil at a temperature of from 750° to 950° F. during contact with the catalyst, withdrawing catalyst after contact with the oil from one end of said reaction zone, withdrawing vaporous products of conversion from the other end of said reaction zone and fractionating them to recover normally liquid products of conversion therefrom.

5. In a process for effecting a chemical reaction wherein a gaseous fluid is treated with a nonfluidized solid particulate catalyst in a reaction zone to effect said chemical reaction, the steps which comprise passing said catalyst through said reaction zone in a substantially helical path, said catalyst occupying a major portion of the free space of said reaction zone, passing a stream of said gaseous fluid in a substantially helical path through said catalyst in said reaction zone, withdrawing reacted fluid from said reaction zone, and withdrawing said catalyst from said reaction zone.

6. The process of claim 5 wherein the catalyst withdrawn from the reaction zone is recycled to the reaction zone.

7. In a process for effecting a chemical reaction wherein a gaseous fluid is treated with a nonfluidized solid particulate catalyst in a reaction zone to effect said chemical reaction, and wherein the catalyst becomes at least partially deactivated in said chemical reaction, the steps which comprise passing said catalyst through said reaction zone in a substantially helical path, said catalyst occupying a major portion of the free space of said reaction zone, passing a stream of said gaseous fluid in a substantially helical path through said catalyst in said reaction zone, withdrawing reacted fluid from said reaction zone, withdrawing at least partially deactivated catalyst from said reaction zone, regenerating said deactivated catalyst, and recycling regenerated catalyst to the first-mentioned reaction zone.

8. In a hydrocarbon conversion process wherein a hydrocarbon gas is treated with a non-fluidized solid particulate catalyst in a reaction zone under conversion conditions and wherein the catalyst becomes at least partially deactivated in said conversion, the steps which comprise passing said catalyst through said reaction zone in a substantially helical path, said catalyst occupying a major portion of the free space of said reaction zone, passing a stream of hydrocarbon gas in a substantially helical path through said catalyst in said reaction zone, withdrawing converted hydrocarbons from said reaction zone, withdrawing at least partially deactivated catalyst from said reaction zone, passing said deactivated catalyst in a substantially helical path through a regeneration zone maintained under regenerating and non-fluidizing conditions, said catalyst occupying a major portion of the free space of said regeneration zone, passing a stream of a regenerating medium in a substantially helical path through said catalyst in said regeneration zone, withdrawing regenerated catalyst from the regeneration zone, and recycling said regenerated catalyst to the first-mentioned reaction zone.

9. In a hydrocarbon conversion process wherein a hydrocarbon gas is treated with a solid particulate catalyst in a reaction zone under conversion conditions and wherein the catalyst becomes at least partially deactivated in said conversion, the steps which comprise passing said deactivated catalyst in a substantially helical path through a regeneration zone maintained under regenerating and non-fluidizing conditions, said catalyst occupying a major portion of the free space of said regeneration zone, passing a stream of a regenerating medium in a substantially helical path through said catalyst in said regeneration zone, and withdrawing from said regeneration zone regenerated catalyst adapted for reuse in said hydrocarbon conversion.

10. The process of claim 9 wherein the deactivated catalyst and the regenerating medium are passed countercurrently through the regeneration zone.

11. The process of claim 9 wherein a part of the regenerating medium is passed through the catalyst in the regeneration zone in a substantially straight line.

12. A process for treating hydrocarbons to modify the properties thereof which comprises passing a non-fluidized solid particulate treating agent into a helicoidal reaction zone having its principal axis in a substantially horizontal plane, maintaining an amount of treating agent in said reaction zone sufficient to occupy a major portion of the free space thereof, rotating said reaction zone about its principal axis to effect movement of the treating agent through the reaction zone away from the point of introduction of the treating agent, passing a stream of hydrocarbon fluid through said reaction zone thereby effecting intimate contact of the treating agent and the hydrocarbon fluid, withdrawing said treating agent from said reaction zone after contact thereof with the hydrocarbon fluid, and withdrawing a stream of treated hydrocarbon fluid from the reaction zone.

13. The process of claim 12 wherein the treating agent occupies between 50 per cent and 90 per cent of the reaction zone.

14. The process of claim 12 wherein the treating agent occupies between about 55 per cent and 75 per cent of the reaction zone.

15. A process for treating hydrocarbons to modify the properties thereof which comprises passing a non-fluidized solid particulate treating agent into a helicoidal annular reaction zone having its principal axis in a substantially horizontal plane, maintaining an amount of treating agent in said reaction zone sufficient to occupy a major portion of the free space thereof, rotating said reaction zone about its principal axis to effect movement of the treating agent through the reaction zone away from the point of introduction of the treating agent, passing a stream of hydrocarbon fluid through said reaction zone thereby effecting intimate contact of the treating agent and the hydrocarbon fluid, withdrawing said treating agent from said reaction zone after contact thereof with the hydrocarbon fluid, and withdrawing a stream of treated hydrocarbon fluid from the reaction zone.

16. The process of claim 15 wherein the treating agent occupies between about 67 per cent to 80 per cent of the reaction zone.

17. A process for treating a fluid with a solid particulate treating agent which comprises continuously passing a non-fluidized solid particulate treating agent into a helicoidal reaction zone having its principal axis in a substantially horizontal plane, rotating said reaction zone about its principal axis in a direction to effect apparent longitudinal movement of the said helicoidal reaction zone along its principal axis towards the point of introduction of the treating agent, thereby effecting movement of the treating agent through the reaction zone away from its point of introduction and maintaining an amount of treating agent in the reaction zone sufficient to occupy a major portion of the free space thereof, passing a stream of fluid to be treated through said reaction zone thereby effecting intimate contact of the treating agent and the fluid, withdrawing a stream of treated fluid from the reaction zone, and withdrawing said treating agent from said reaction zone after contact thereof with said fluid.

18. The process of claim 17 wherein a part of the fluid to be treated is passed through the reaction zone in a substantially straight line.

19. The process of claim 17 wherein the reaction zone is a helicoidal annular reaction zone.

20. The process of claim 17 wherein the rate of withdrawal of treating agent from said reaction zone is controlled to control the amount of treating agent maintained in the reaction zone.

21. A process for treating hydrocarbons to modify the properties thereof which comprises continuously passing a non-fluidized solid particulate treating agent into a helicoidal reaction zone having its principal axis in a substantially horizontal plane, rotating said reaction zone about its principal axis in a direction to effect apparent longitudinal movement of the said helicoidal reaction zone along its principal axis towards the point of introduction of the treating agent, thereby effecting movement of the treating agent through the reaction zone away from its point of introduction and maintaining an amount of treating agent in the reaction zone sufficient to occupy a major portion of the free space thereof, passing a stream of hydrocarbon fluid through said reaction zone thereby effecting intimate contact of the treating agent and the hydrocarbon fluid, withdrawing a stream of treated hydrocarbon fluid from the reaction zone, and controlling the rate of withdrawal of treating agent from said reaction zone to control the amount of treating agent maintained in the reaction zone.

22. The process of claim 21 wherein the rate of withdrawal of treating agent is so controlled that the treating agent occupies between 50 per cent and 90 per cent of the reaction zone.

23. The process of claim 21 wherein the rate of withdrawal of treating agent is so controlled that the treating agent occupies between about 55 per cent and 75 per cent of the reaction zone.

24. The process of claim 21 wherein the reaction zone is a helicoidal annular reaction zone and the rate of withdrawal of treating agent is so controlled that the treating agent occupies between about 67 per cent and 80 per cent of the reaction zone.

25. In a hydrocarbon conversion process wherein a hydrocarbon gas is treated with a non-fluidized solid particulate catalyst in a reaction zone under conversion conditions and wherein the catalyst becomes at least partially deactivated in said conversion, the steps which comprise continuously passing said catalyst into a helicoidal annular reaction zone having its principal axis in a substantially horizontal plane, rotating said reaction zone about its principal axis in a direction to effect apparent longitudinal movement of the said helicoidal annular reaction zone along its principal axis towards the point of introduction of the catalyst, thereby effecting movement of the catalyst through the reaction zone away from its point of introduction and maintaining an amount of catalyst in the reaction zone sufficient to occupy a major portion of the free space thereof, passing a stream of hydrocarbon gas through said reaction zone countercurrent to the movement of catalyst thereby effecting intimate contact of the catalyst and hydrocarbon gas, withdrawing a stream of converted hydrocarbon gas from the reaction zone, controlling the rate of withdrawal of at least partially deactivated catalyst from said reaction zone to control the amount of catalyst maintained in the reaction zone, regenerating said deactivated catalyst in a regeneration zone, and recycling regenerated catalyst to the reaction zone.

26. The process of claim 25 wherein the rate of withdrawal of deactivated catalyst is so controlled that the catalyst occupies between about 67 per cent and 80 per cent of the reaction zone.

27. In a hydrocarbon conversion process wherein a hydrocarbon gas is treated with a solid particulate catalyst in a reaction zone under conversion conditions and wherein the catalyst becomes at least partially deactivated in said conversion, the steps which comprise continuously passing said deactivated catalyst into a helicoidal annular regeneration zone having its principal axis in a substantially horizontal plane and maintained under regenerating and non-fluidizing conditions, rotating said regeneration zone about its principal axis in a direction to effect apparent longitudinal movement of the said helicoidal annular regeneration zone along its principal axis towards the point of introduction of the deactivated catalyst, thereby effecting movement of the deactivated catalyst through the regeneration zone away from its point of introduction and maintaining an amount of deactivated catalyst in the regeneration zone sufficient to occupy a major portion of the free space thereof, passing a stream of a regenerating medium through said regeneration zone thereby regenerating the deactivated catalyst, controlling the rate of withdrawal of regenerated catalyst to control the amount of deactivated catalyst maintained in the regeneration zone, and recycling regenerated catalyst to the reaction zone.

28. The process of claim 27, wherein a part of the regenerating medium is passed through the regeneration zone in a substantially straight line.

29. A process for continuously coking a heavy oil which comprises contacting said oil with a hot, granular, porous refractory material, passing the mixture of said oil and said granular material in a substantially helical path through a reaction zone maintained under coking and non-fluidizing conditions, said mixture of oil and granular material occupying a major portion of the free space of said reaction zone, passing a stream of an inert gas in a substantially helical path through said mixture in said reaction zone, withdrawing vaporized products from said reaction zone, withdrawing a mixture of solid coke and said granular material from said reaction zone, regenerating and heating said granular material, and contacting further quantities of heavy oil with said hot regenerated granular material.

30. A process for continuously coking a heavy oil which comprises contacting said oil with a hot, granular, porous refractory material to volatilize the vaporizable portions of said heavy oil and to absorb the non-vaporized portions of said heavy oil in the pores of the granular, porous refractory material, recovering the volatilized vaporizable portions of said heavy oil, continuously passing the mixture of said granular, porous refractory material and the non-vaporizable portions of said heavy oil into a helicoidal reaction zone maintained under coking and non-fluidizing conditions and having its principal axis in a substantially horizontal plane, rotating said reaction zone about its principal axis in a direction to effect apparent longitudinal movement of the said helicoidal reaction zone along its principal axis towards the point of introduction of the mixture of said granular, porous refractory material and the non-vaporizable portions of said heavy oil, thereby effecting movement of said mixture through the reaction zone away from its point of introduction and maintaining an amount of said mixture in the reaction zone sufficient to occupy a major portion of the free space thereof, passing a stream of an inert gas through said reaction zone thereby effecting intimate contact of said inert gas and said mixture and removing vaporized products from the reaction zone, recovering said vaporized products, withdrawing a mixture of solid coke and said granular, porous refractory material from said reaction zone, burning off said coke from said granular, porous refractory material, and contacting further quantities of heavy oil with the resulting hot, granular, porous refractory material.

31. The process of claim 30 wherein the reaction zone is a helicoidal annular reaction zone.

32. The process of claim 30 wherein the granular, porous, refractory material is a granular, porous coke, and only a portion of the coke formed from the heavy oil in the reaction zone is burned off.

33. A process for synthesizing hydrocarbons which comprises passing a solid, particulate synthesis catalyst in a substantially helical path through a reaction zone, said catalyst occupying a major portion of the free space of said reaction zone, passing a stream of a synthesis gas comprising hydrogen and carbon monoxide in a substantially helical path through said catalyst in said reaction zone, withdrawing synthesized hydrocarbons from said reaction zone, withdrawing said catalyst from said reaction zone, and recycling said catalyst to the reaction zone.

34. A process for synthesizing hydrocarbons which comprises continuously passing a solid, particulate synthesis catalyst into a helicoidal reaction zone having its principal axis in a substantially horizontal plane and maintained under synthesising and non-fluidizing conditions, rotating said reaction zone about its principal axis in a direction to effect apparent longitudinal movement of the said helicoidal reaction zone along its principal axis towards the point of introduction of the catalyst, thereby effecting movement of the catalyst through the reaction zone away from its point of introduction and maintaining an amount of catalyst in the reaction zone sufficient to occupy a major portion of the free space thereof, passing a stream of synthesis gas comprising hydrogen and carbon monoxide through said reaction zone thereby effecting intimate contact of the catalyst and the synthesis gas, withdrawing synthesized hydrocarbons from said reaction zone, recovering said synthesized hydrocarbons, withdrawing said catalyst from said reaction zone, and recycling the withdrawn catalyst to the reaction zone.

35. The process of claim 34 wherein the reaction zone is a helicoidal annular reaction zone.

36. Apparatus for effecting a chemical reaction wherein a fluid is treated with a solid particulate treating agent comprising a closed cylindrical shell; a helicoid coaxially disposed within said shell and attached at its periphery to the inner wall of said shell; means for rotating said shell and helicoid as a unit about their common principal axis; inlet means for introducing said treating agent at one end of said shell, said inlet means being so positioned with respect to the helicoid that upon rotation of said shell and helicoid, the helicoid will have an apparent longitudinal movement along its principal axis toward said inlet means; outlet means for withdrawing treating agent disposed at the opposite end of said shell from said inlet means; and means for introducing fluid at one end of said shell and for withdrawing treated fluid at the other end.

37. Apparatus for effecting a chemical reaction wherein a fluid is treated with a solid particulate treating agent comprising: a closed cylindrical shell; a helicoid coaxially disposed within said shell and attached at its periphery to the inner wall of said shell; means for rotating said shell and helicoid as a unit about their common principal axis; inlet means for introducing said treating agent at one end of said shell, said inlet means being so positioned with respect to the helicoid that upon rotation of said shell and helicoid, the helicoid will have an apparent longitudinal movement along its principal axis toward said inlet means; outlet means for withdrawing treating agent disposed at the opposite end of said shell from said inlet means; means for controlling the amount of treating agent withdrawn from said shell; and means for introducing fluid at one end of said shell and for withdrawing treated fluid at the other end.

38. Apparatus for effecting a chemical reaction wherein a fluid is treated with a solid particulate treating agent, comprising: a closed cylindrical shell; a core member coaxially disposed within said shell; a helicoid coaxially disposed within said shell, attached at its periphery to the inner wall of said shell, and mounted on said core member; means for rotating said shell, core member and helicoid as a unit about their common principal axis; inlet means for introducing said treating agent at one end of said shell, said inlet means being so positioned with respect to the helicoid that upon rotation thereof, the helicoid will have an apparent longitudinal movement along its principal axis toward said inlet means; outlet means for withdrawing treating agent disposed at the opposite end of said shell from said inlet means; means for controlling the amount of treating agent withdrawn from said shell; and means for introducing fluid at one end of said shell and for withdrawing treated fluid at the other end.

39. Apparatus as claimed in claim 38, wherein the core member is of cylindrical configuration.

40. Apparatus as claimed in claim 38, wherein the core member comprises a plurality of radially disposed vanes.

41. Apparatus as claimed in claim 38, wherein the core member occupies from 10 to 50 per cent of the total volume of said shell.

42. Apparatus as claimed in claim 38, wherein the core member occupies from 25 to 35 per cent of the total volume of said shell.

43. Apparatus as claimed in claim 38, wherein the helicoid is provided with a plurality of ports in the outer portions thereof.

44. Apparatus for effecting a chemical reaction wherein a fluid is treated with a solid particulate treating agent, comprising: a closed cylindrical shell; a hollow core member coaxially disposed within said shell; means for passing a fluid heat-controlling medium through said core member; a helicoid coaxially disposed within said shell, attached at its periphery to the inner wall of said shell, and mounted on said core member; means for rotating said shell, core member and helicoid as a unit about their common principal axis; inlet means for introducing said treating agent at one end of said shell, said inlet means being so positioned with respect to the helicoid that upon rotation thereof, the helicoid will have an apparent longitudinal movement along its principal axis toward said inlet means; outlet means for withdrawing treating agent disposed at the opposite end of said shell from said inlet means; means for controlling the amount of treating agent withdrawn from said shell; and means for introducing fluid at one end of said shell and for withdrawing treated fluid at the other end.

45. Apparatus for effecting a chemical reaction wherein a fluid is treated with a solid particulate treating agent, comprising: a closed cylindrical shell; a stationary casing surrounding said shell; means for passing a fluid heat-controlling medium through the space between said shell and said casing; a helicoid coaxially disposed within said shell and attached at its periphery to the inner wall of said shell; means for rotating said shell and helicoid as a unit about their common principal axis; inlet means for introducing said treating agent at one end of said shell, said inlet means being so positioned with respect to the helicoid that upon rotation of said shell and helicoid, the helicoid will have an apparent longitudinal movement along its principal axis toward said inlet means; outlet means for withdrawing treating agent disposed at the opposite end of said shell from said inlet means; means for controlling the amount of treating agent withdrawn from said shell; and means for introducing fluid at one end of said shell and for withdrawing treated fluid at the other end.

46. Apparatus for effecting conversion of hydrocarbon gases in the presence of a solid particulate catalyst comprising in combination: a closed cylindrical shell; a cylindrical core member coaxially disposed within said shell; a helicoid coaxially disposed within said shell, attached at its periphery to the inner wall of said shell, and mounted on said core member; means for rotating said shell, core member and helicoid as a unit about their common principal axis; inlet means for introducing said catalyst at one end of said shell, said inlet means being so positioned with respect to the helicoid that upon rotation thereof, the helicoid will have an apparent longitudinal movement along its principal axis toward said inlet means; outlet means for withdrawing at least partially deactivated catalyst disposed at the opposite end of said shell from said inlet means; means for introducing hydrocarbon gas at one end of said shell and for withdrawing converted hydrocarbon at the other end; means for regenerating said deactivated catalyst; and means for recycling regenerated catalyst to the aforementioned inlet means.

WILLIAM C. OFFUTT.
MERALD C. FOGLE.
RALPH W. HELWIG.

REFERENCES CITED

The following references are of record in the file of this patent:

UNITED STATES PATENTS

| Number | Name | Date |
|---|---|---|
| 519,393 | Rose | May 8, 1894 |
| 612,181 | Spurrier | Oct. 11, 1898 |
| 1,487,836 | Brown | Mar. 25, 1924 |
| 1,900,047 | Derby | Mar. 7, 1933 |
| 2,347,747 | Melaven | May 2, 1944 |
| 2,350,204 | Wagner et al. | May 30, 1944 |
| 2,370,816 | Schonberg | Mar. 6, 1945 |
| 2,388,642 | Ostergaard | Nov. 6, 1945 |
| 2,393,909 | Johnson | Jan. 29, 1946 |

FOREIGN PATENTS

| Number | Country | Date |
|---|---|---|
| 715,894 | France | Sept. 29, 1931 |

OTHER REFERENCES

Ser. No. 434,440, Woog (A. P. C.), published June 1, 1943.